United States Patent
Harp et al.

(10) Patent No.: US 10,807,693 B2
(45) Date of Patent: Oct. 20, 2020

(54) AIRCRAFT AIR STAIR SUPPORT

(71) Applicant: Gulfstream Aerospace Corporation, Savannah, GA (US)

(72) Inventors: Michael Harp, Savannah, GA (US); Quent Mikeal, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/813,238

(22) Filed: Mar. 9, 2020

(65) Prior Publication Data
US 2020/0216159 A1 Jul. 9, 2020

Related U.S. Application Data

(63) Continuation of application No. 15/003,427, filed on Jan. 21, 2016.

(51) Int. Cl.
| | | |
|---|---|---|
| *B64C 1/14* | (2006.01) | |
| *B64C 1/24* | (2006.01) | |
| *B64D 9/00* | (2006.01) | |
| *B63B 27/14* | (2006.01) | |

(52) U.S. Cl.
CPC ............ *B64C 1/1423* (2013.01); *B63B 27/14* (2013.01); *B64C 1/1407* (2013.01); *B64C 1/24* (2013.01); *B64D 9/00* (2013.01); *B64C 1/1415* (2013.01)

(58) Field of Classification Search
CPC ....... B64C 1/24; B64C 1/1415; B64C 1/1423; B64C 1/143; B64F 1/315; F16B 45/00
USPC .................................................. 248/304, 339
See application file for complete search history.

(56) References Cited

U.S. PATENT DOCUMENTS

| | | | |
|---|---|---|---|
| 1,166,141 | A | 12/1915 | Merrettig |
| 2,453,937 | A | 11/1948 | Ray |
| 2,558,975 | A | 7/1951 | Moreno et al. |
| 2,910,255 | A | 10/1959 | Johnson |
| 3,232,565 | A | 2/1966 | Hackenberger, Jr. |
| 4,453,684 | A | 6/1984 | Hanks |
| 4,478,549 | A | 10/1984 | Stelly |
| 4,957,259 | A | 9/1990 | Wolf, Jr. |
| 5,788,311 | A | 8/1998 | Tibbals |
| 5,803,404 | A | 9/1998 | Petrou et al. |
| 5,913,479 | A | 6/1999 | Westwood, III |

(Continued)

OTHER PUBLICATIONS

Not Specified: "Super king air rear stairs", Dec. 1, 2013, XP55360062, Retrieved on Mar. 29, 2017 from the Internet at: URL:http://web.archive.org/web/20131216013925/http://moorabbinaircharters.com.au/wp-content/uploads/zok-super-king-air-rear-stairs.j.

*Primary Examiner* — Richard R. Green
(74) *Attorney, Agent, or Firm* — LKGlobal | Lorenz & Kopf, LLP

(57) ABSTRACT

Air stair support systems, stair support cable assemblies, and hooks are disclosed herein. A stair support system includes, but is not limited to, an aircraft fuselage, a door seal, a stair door, and a stair support cable assembly. The aircraft fuselage defines a door frame and a stair hook receptacle. The stair door has a retracted position within the door frame and an extended position that forms an entry/exit stairway. The stair support cable assembly includes a cable and two hooks. The first hook includes a curved end portion configured to hook onto the stair hook receptacle, a cable end portion secured to the cable, and an intermediate portion having first and second intermediate legs that extend the intermediate portion away from the door seal when installed on the door frame and the stair door. The second hook is configured to hook on the stair door.

13 Claims, 3 Drawing Sheets

(56) References Cited

U.S. PATENT DOCUMENTS

| | | |
|---|---|---|
| 7,409,921 B1 | 8/2008 | Jones |
| 9,121,437 B1 | 9/2015 | Carnicle et al. |
| 9,145,948 B2 | 9/2015 | Corio |
| 2015/0083878 A1 | 3/2015 | Daniels et al. |
| 2015/0198955 A1 | 7/2015 | De La Bardonnie et al. |
| 2015/0237841 A1 | 8/2015 | Petersen |
| 2016/0317849 A1 | 11/2016 | Cowell et al. | ated that the stair support system described herein is

AIRCRAFT AIR STAIR SUPPORT

CROSS-REFERENCE TO RELATED APPLICATION

This is a continuation of U.S. patent application Ser. No. 15/003,427, filed Jan. 21, 2016, which is incorporated herein by reference in its entirety.

TECHNICAL FIELD

The present invention generally relates to air stair supports for aircraft, and more particularly relates to air stair supports with air stair support cables having door frame seal avoidance features.

BACKGROUND

While repositioning aircraft, operators typically use a stair door retaining cable to support the main entrance door. This retaining cable holds the door up off the ground to prevent dragging while the aircraft is moved. Conventional retaining cables may damage depressor bulb seals on the door frame when the conventional hooks of such cables chafe against the bulb seals. Chafing on the bulb seals may interfere with sealing of the bulb seal with the main entrance door seal on door closure.

Accordingly, it is desirable to provide a retaining cable assembly that reduces chafing of door seals on aircraft. Furthermore, other desirable features and characteristics will become apparent from the subsequent detailed description and the appended claims, taken in conjunction with the accompanying drawings and the foregoing technical field and background.

BRIEF SUMMARY

Air stair support systems, stair support cable assemblies, and hooks are disclosed herein.

In a first non-limiting embodiment, a stair support system includes, but is not limited to, an aircraft fuselage, a door seal, a stair door, and a stair support cable assembly. The aircraft fuselage defines a door frame and the door frame defines a stair hook receptacle. The door seal is attached to the door frame. The stair door is configured to pivot between a retracted position within the door frame and an extended position in which the stair door is configured to form an aircraft entry/exit stairway. The stair support cable assembly includes at least one cable, a first hook, and a second hook. The cable has a door frame end and a stair end. The first hook includes a curved end portion configured to hook onto the stair hook receptacle, a cable end portion secured to the door frame end, and an intermediate portion having a first intermediate leg and a second intermediate leg that extend the intermediate portion away from the door seal when the stair support cable assembly is installed on the door frame and the stair door. The second hook is configured to secure to the stair end and to hook on the stair door.

In a second non-limiting embodiment, a stair support cable assembly for an air stair support system includes, but is not limited to, at least one cable, a first hook, and a second hook. The air stair support system includes a door seal, a door frame, and a stair door. The at least one cable has a door frame end and a stair end. The first hook includes a curved end portion configured to hook onto the door frame, a cable end portion secured to the door frame end, and an intermediate portion. The intermediate portion includes a first intermediate leg and a second intermediate leg configured to extend the intermediate portion away from the door seal when the stair support cable assembly is installed on the door frame and the stair door. The second hook is configured to secure to the stair end and to hook on the stair door.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved air stair support system with an improved hook for a cable assembly is disclosed herein. As compared with conventional hooks, the hook of the present disclosure provides additional clearance over a door seal on the fuselage of the aircraft to reduce chafing of the door seal. A greater understanding of the air stair support system and the hook described above may be obtained through a review of the illustrations accompanying this application together with a review of the detailed description that follows.

Figure 1A:
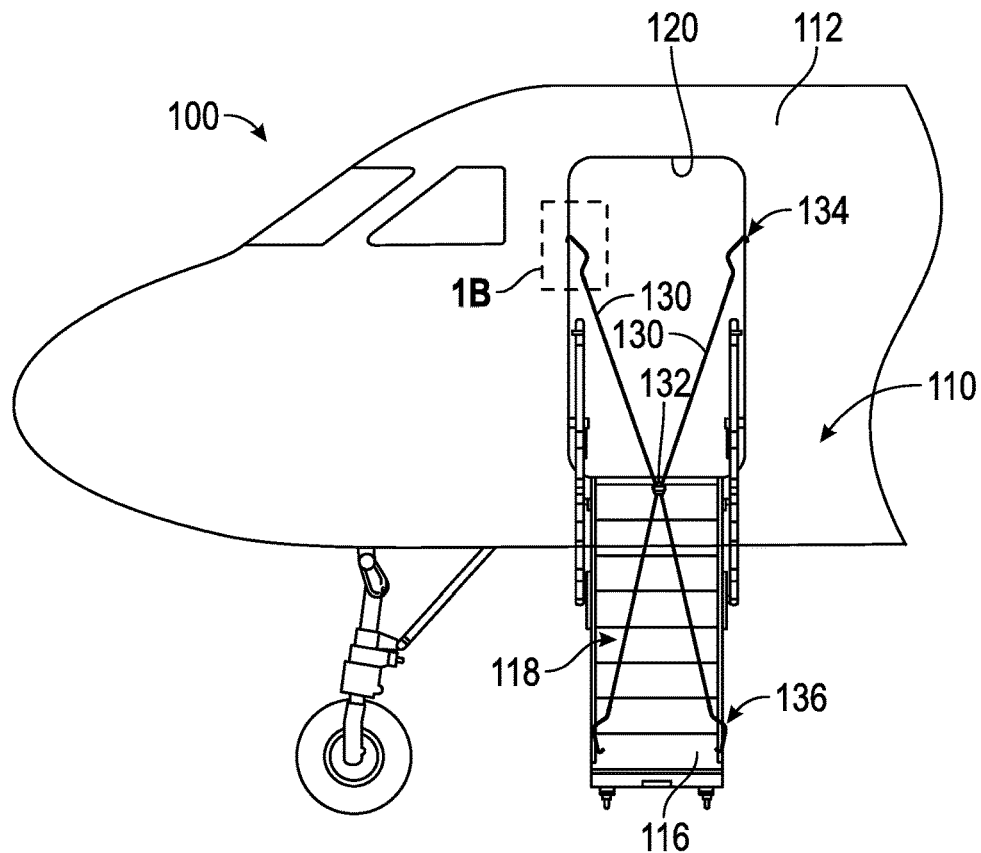
FIG. 1A is an environmental view illustrating a non-limiting embodiment of an air stair support system on an aircraft in accordance with the teachings of the present disclosure.
Figure 1B:
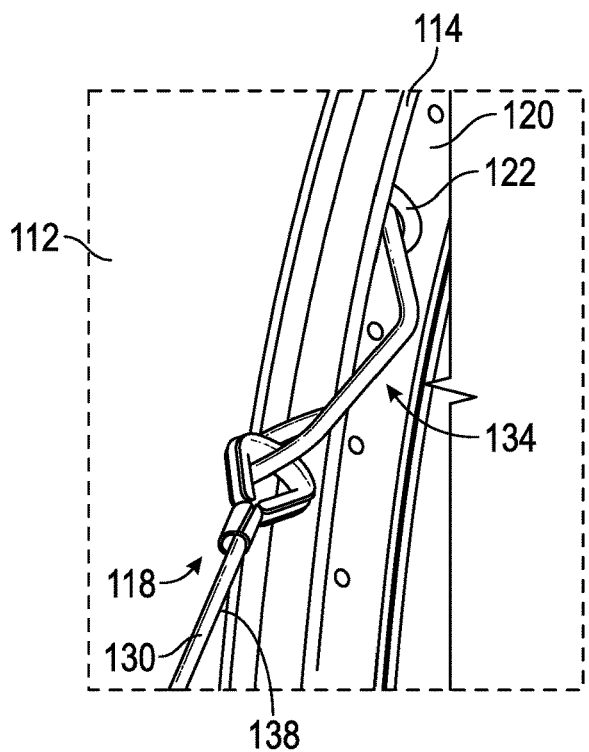
FIG. 1B is an enlarged view of a portion of the air stair support system illustrated in FIG. 1A in accordance with the teachings of the present disclosure.

FIGS. 1A and 1B are environmental views illustrating an air stair support system 110 installed on an aircraft 100. Although the context of the discussion contained herein is with respect to a business jet, it should be understood that the teachings of the present disclosure are compatible with all types of aircraft including, but not limited to, propeller driven aircraft, private jets, commercial jet passenger aircraft, cargo aircraft, military aircraft, and the like. Furthermore, although the systems disclosed herein are described as being compatible for use on board an aircraft, it should be understood that the stair support system described herein is compatible with all types of vehicles. For example, and without limitation, the stair support system may be implemented on board automobiles, buses, trains, ships, spacecraft, and any other type of conveyance.

Air stair support system 110 includes an aircraft fuselage 112, a door seal 114, a stair door 116, and a stair support cable assembly 118. Aircraft fuselage 112 encloses a passenger compartment of aircraft 100 and defines a door frame 120. Door frame 120 is an opening in aircraft fuselage 112 through which passengers and crew enter and exit aircraft 100. Door frame 120 defines a stair hook receptacle 122 into which stair support cable assembly 118 may attach. In the example provided, stair hook receptacle 122 is an aperture in a side wall of door frame 120.

Door seal 114 is attached to door frame 120 to form an air tight seal between door frame 120 and stair door 116. Door seal 114 may be any suitable material, such as an elastomeric or plastic material. In the example provided, door seal 114 is disposed a constant distance inward from an outer skin surface of aircraft fuselage 112 around a periphery of door frame 120. In the example provided, door seal 114 is substantially similar to conventional door seals on conventional aircraft.

Stair door 116 is configured to pivot between a retracted position and an extended position. In the retracted position, stair door 116 is disposed within door frame 120 and includes an outer surface that lies flush with the outer skin surface of aircraft fuselage 112. In the extended position, stair door 116 extends away from aircraft fuselage 112 towards a surface on which aircraft 100 is resting to form an aircraft entry/exit stairway, as will be appreciated by those with ordinary skill in the art. In the example provided, stair door 116 is substantially similar to conventional stair doors on conventional aircraft.

Figure 2A:
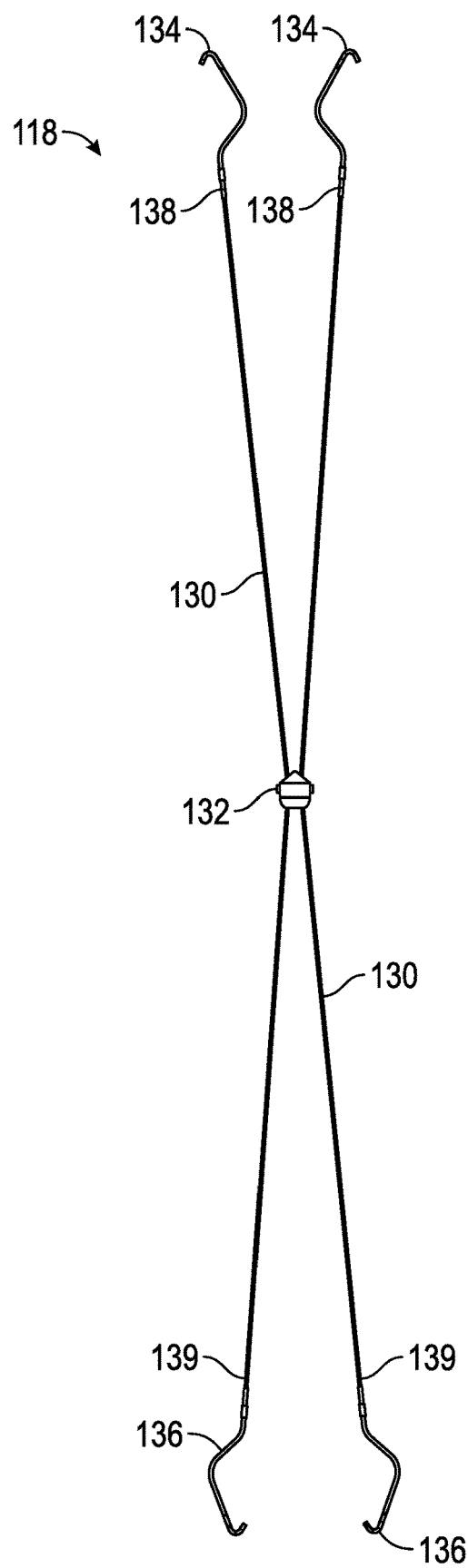
FIGS. 2A and 2B are front and side views illustrating the stair support cable assembly of FIG. 1A in accordance with the teachings of the present disclosure.
Figure 2B:
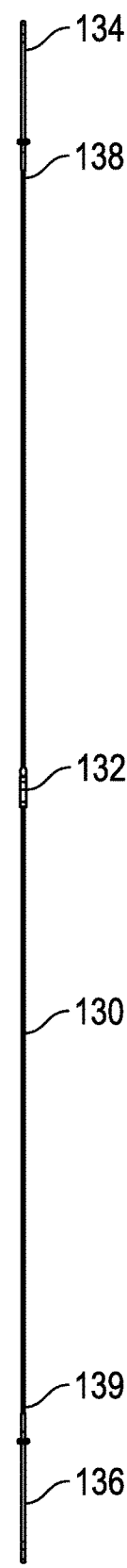

Referring now to FIGS. 2A and 2B, further details of stair support cable assembly 118 are illustrated in front and side views in accordance with the teachings of the present disclosure. Stair support cable assembly 118 may be installed on aircraft 100 to lift stair door 116 off of a ground or other surface to prevent damage during repositioning of aircraft 100. Stair support cable assembly 118 includes a pair of cables 130, a center connector 132, a pair of first hooks 134, and a pair of second hooks 136. Cables 130 each have a door frame end 138 and a stair end 139. Door frame end 138 connects to first hooks 134 adjacent to door frame 120 and stair end 139 connects to second hooks 136 adjacent to stair door 116.

Figure 3:
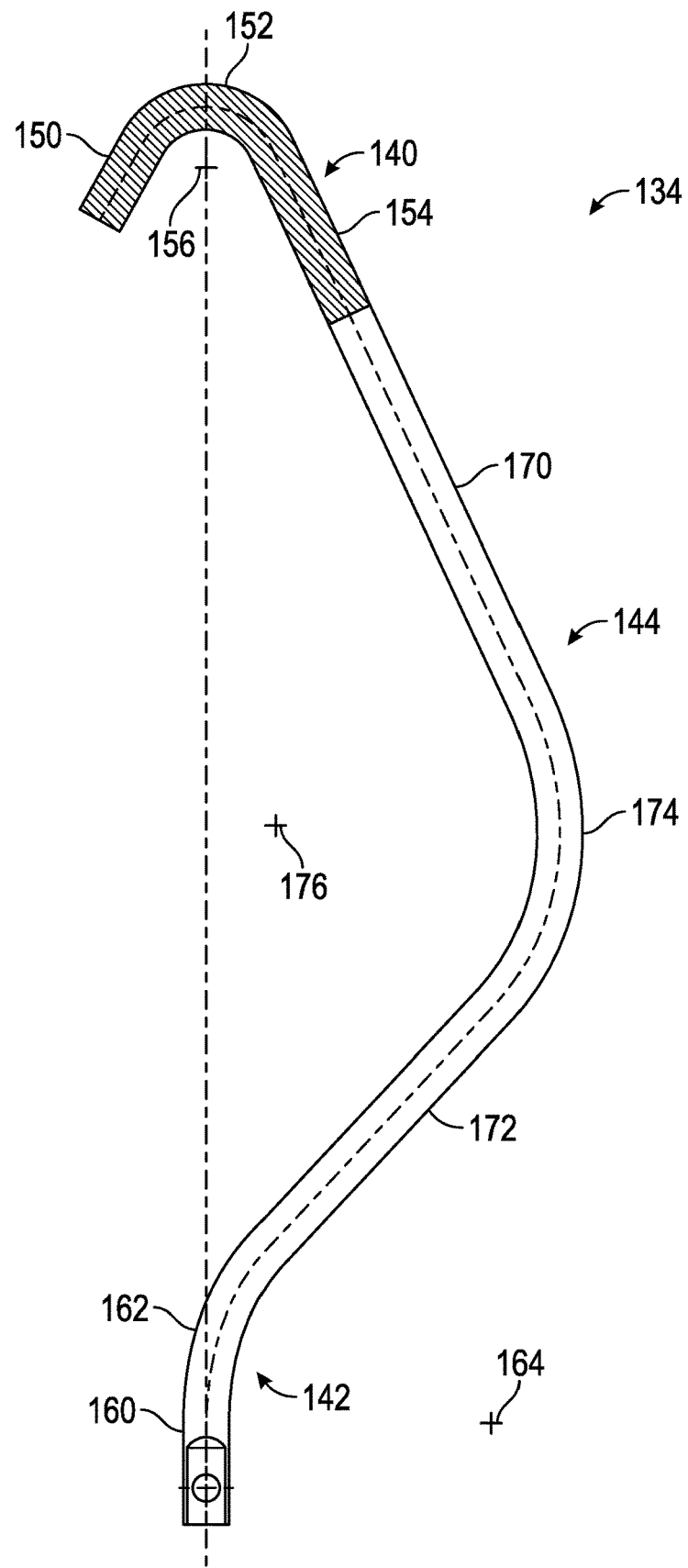
FIG. 3 is a front view illustrating a hook of the stair support cable assembly of FIGS. 2A and 2B in accordance with the teachings of the present disclosure.

Referring now to FIG. 3, and with further reference to FIGS. 1A, 1B, 2A, and 2B, further details of first hooks 134 are illustrated in a front view in accordance with the teachings of the present disclosure. First hooks 134 have a substantially round cross section throughout a length of the first hook. In the example provided, a diameter of first hooks 134 is about one third of an inch and first hooks 134 are made of an alloyed steel material. It should be appreciated that other materials, diameters, and/or shapes may be utilized without departing from the scope of the present disclosure.

First hooks 134 have a curved end portion 140, a cable end portion 142, and an intermediate portion 144. Curved end portion 140 is configured to hook onto stair hook receptacle 122 and cable end portion 142 is secured to the door frame end of one of the cables 130. In the example provided, first hooks 134 include an elastomeric coating disposed on curved end portion 140 to further protect door frame 120 and door seal 114 from damage due to incidental contact between curved end portion 140 and door frame 120 or door seal 114.

Curved end portion 140 is configured to hook into stair hook receptacle 122 of door frame 120. Curved end portion 140 includes a first hook leg 150, a hook curve portion 152, and a second hook leg 154. First hook leg 150 and second hook leg 154 are substantially straight and are oriented in the same plane at about a 60 degree angle with respect to each other. Hook curve portion 152 has a constant radius of curvature having a center point 156. In the example provided, the radius of curvature of hook curve portion 152 is about one half of an inch. It should be appreciated that other radii and leg angles may be incorporated without departing from the scope of the disclosure.

Cable end portion 142 secures to door frame end 138 of cables 130. Cable end portion 142 includes a cable end leg 160 and a cable end curved portion 162. Cable end leg 160 attaches to door frame end 138 of one of the cables 130 and cable end curved portion 162 is disposed between cable end leg 160 and intermediate portion 144. In the example provided, cable end curved portion 162 has a single constant radius of curvature of two inches centered on center point 164.

Intermediate portion 144 includes a first intermediate leg 170 and a second intermediate leg 172 connected by an intermediate curved portion 174. First intermediate leg 170 and second intermediate leg 172 are substantially straight and extend intermediate portion 144 away from door seal 114 when stair support cable assembly 118 is installed on door frame 120 and stair door 116. In some embodiments, the single constant radius of curvature of the cable end curved portion is the same as the single constant radius of curvature of the intermediate curved portion. In some embodiments, the hook curve portion has a radius of curvature that is about one quarter of the single constant radius of curvature of the intermediate curved portion. In the example provided, intermediate curved portion 174 has a constant radius of curvature of about two inches centered on center point 176.

First intermediate leg 170 and second intermediate leg 172 have dimensions such that a plane perpendicular to the inner wall of door frame 120 that passes through door seal 114 intersects intermediate portion 144 between the first intermediate leg and the second intermediate leg when the stair support cable assembly is installed on the door frame and the stair door. In other words, a gap between door frame 120 and first hook 124 is largest directly over door seal 114. In the example provided, first intermediate leg 170 is adjacent to curved end portion 140 and has a first length. Second intermediate leg 172 is adjacent to cable end portion 142 and has a second length that is less than the first length.

Second hooks 136 are configured to secure to the stair end of cables 130 and to hook on stair door 116. In the example provided, second hooks 136 are substantially similar to first hooks 134. It should be appreciated that second hooks 136 may have different shapes and configurations to protect features of stair door 116 without departing from the scope of the present disclosure.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. An air stair support system comprising:
    an aircraft fuselage defining a door frame that defines a door opening, the door frame defining a stair hook receptacle;
    a stair door configured to pivot between a retracted position within the door opening and an extended position in which the stair door is configured to form an aircraft entry/exit stairway;

a door bulb seal attached to the door frame and extending into the door opening; and a stair support cable assembly comprising:

at least one cable having a door frame end and a stair end, the at least one cable extending away from the door frame along a line that passes through the door bulb seal;

a first hook comprising:

a curved end portion hooked onto the stair hook receptacle;

a cable end portion secured to the door frame end of the at least one cable at the line; and an intermediate portion including a first intermediate leg, a second intermediate leg, and a curved middle portion, wherein the first intermediate leg is adjacent to the curved end portion and is substantially straight, and wherein the second intermediate leg is adjacent to the cable end portion and is substantially straight, and wherein the curved middle portion is connected to the first intermediate leg and the second intermediate leg and defines a widest lateral dimension of the first hook to extend the intermediate portion away from the door bulb seal when the stair support cable assembly is installed on the door frame and the stair door; and a second hook configured to secure to the stair end and to hook on the stair door.

2. The air stair support system of claim 1, wherein the stair support cable assembly further includes an elastomeric coating disposed on the curved end portion.

3. The air stair support system of claim 1, wherein the first intermediate leg and the second intermediate leg have dimensions such that a plane perpendicular to the door frame and passing through the door bulb seal intersects the curved middle portion of the intermediate portion when the stair support cable assembly is installed on the door frame and the stair door.

4. The air stair support system of claim 1, wherein the first intermediate leg is adjacent to the curved end portion and has a first length, and wherein the second intermediate leg is adjacent to the cable end portion and has a second length that is less than the first length.

5. The air stair support system of claim 1, wherein the first intermediate leg and the second intermediate leg are substantially straight.

6. The air stair support system of claim 1, wherein the cable end portion includes a cable end curved portion and the intermediate portion includes an intermediate curved portion disposed between the first intermediate leg and the second intermediate leg, and wherein the cable end curved portion and the intermediate curved portion each have a single constant radius of curvature.

7. The air stair support system of claim 6, wherein the single constant radius of curvature of the cable end curved portion is the same as the single constant radius of curvature of the intermediate curved portion.

8. The air stair support system of claim 7, wherein the curved end portion includes a first hook leg, a hook curve portion, and a second hook leg, and wherein the hook curve portion has a radius of curvature that is about one quarter of the single constant radius of curvature of the intermediate curved portion.

9. The air stair support system of claim 1, wherein the first hook has a substantially round cross section throughout a length of the first hook.

10. The air stair support system of claim 1, wherein the stair hook receptacle is an aperture in the door frame.

11. The air stair support system of claim 1, wherein the cable end portion includes a cable end curved portion and the intermediate portion includes an intermediate curved portion disposed between the first intermediate leg and the second intermediate leg, and wherein the cable end curved portion and the intermediate curved portion each have a single constant radius of curvature.

12. The air stair support system of claim 11, wherein the single constant radius of curvature of the cable end curved portion is the same as the single constant radius of curvature of the intermediate curved portion.

13. The air stair support system of claim 12, wherein the curved end portion includes a first hook leg, a hook curve portion, and a second hook leg, and wherein the hook curve portion has a radius of curvature that is about one quarter of the single constant radius of curvature of the intermediate curved portion.

\* \* \* \* \*